United States Patent

Saderholm et al.

[11] Patent Number: 5,709,405
[45] Date of Patent: Jan. 20, 1998

[54] VARIABLE MASS FLOW AIRBAG MODULE

[75] Inventors: Davin G. Saderholm, Salt Lake City; Kevin E. Hauppa, Ogden; Daniel R. Leininger, Layton, all of Utah; Ian C. Faye, Stuttgart, Germany

[73] Assignees: Morton International, Inc., Chicago, Ill.; Robert Bosch GmbH, Stuttgart, Germany

[21] Appl. No.: 630,379

[22] Filed: Apr. 10, 1996

[51] Int. Cl.[6] ............................................. B60R 21/26
[52] U.S. Cl. ........................ 280/736; 280/738; 280/739
[58] Field of Search .................................. 280/735, 736, 280/738, 739, 740

[56] References Cited

U.S. PATENT DOCUMENTS

| | | |
|---|---|---|
| 3,672,699 | 6/1972 | DeWindt . |
| 3,767,002 | 10/1973 | Gillund . |
| 3,767,228 | 10/1973 | Lewis . |
| 3,966,224 | 6/1976 | Campbell et al. ............... 280/735 |
| 4,243,248 | 1/1981 | Scholz et al. ................... 280/735 |
| 4,620,721 | 11/1986 | Scholz et al. ................... 280/735 |
| 4,984,651 | 1/1991 | Grosch et al. .................. 180/268 |
| 5,071,160 | 12/1981 | White et al. .................... 280/735 |
| 5,074,583 | 12/1991 | Fujita et al. ..................... 280/735 |
| 5,232,243 | 8/1993 | Blackburn et al. .............. 280/732 |
| 5,330,226 | 7/1994 | Gentry et al. ................... 280/735 |
| 5,366,242 | 11/1994 | Faigle et al. .................... 280/739 |

Primary Examiner—Kenneth R. Rice
Attorney, Agent, or Firm—Philip C. Peterson; Steven C. Benjamin; Gerald K. White

[57] ABSTRACT

A variable mass flow airbag module includes a housing having gas discharge ports in direct communication with an airbag to be inflated for rapidly inflating the airbag and adapted to receive gas from a pyrotechnic inflator, stored gas or hybrid inflator, or other type of inflator. The housing has a vent opening which is controlled by a valve to vent a controlled variable amount of gas to achieve a desired mass flow of gas into the airbag to provide a desired level of energy absorption capability for optimizing occupant protection.

6 Claims, 3 Drawing Sheets

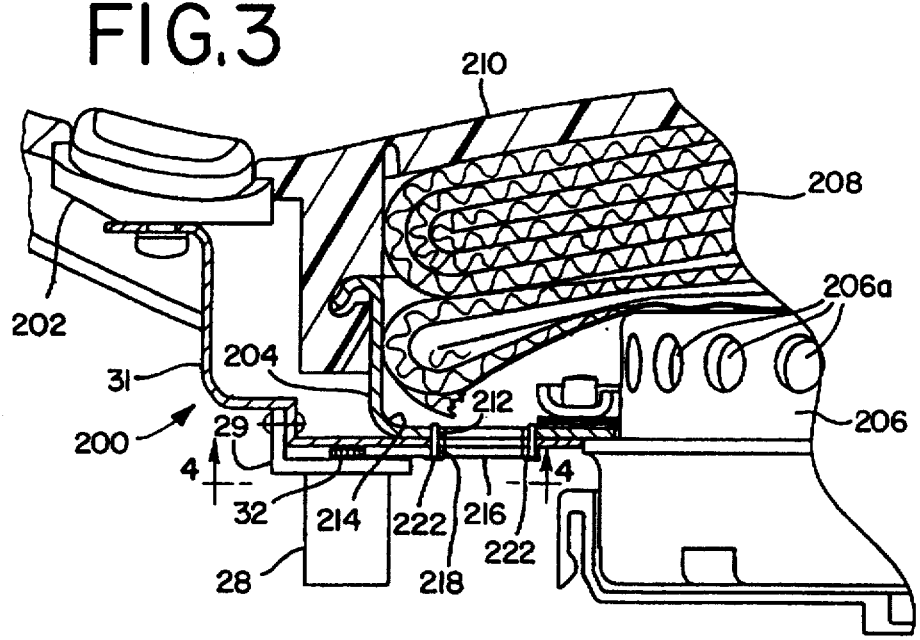
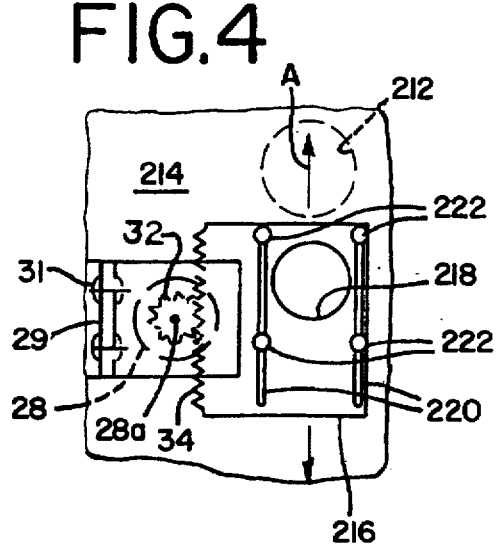
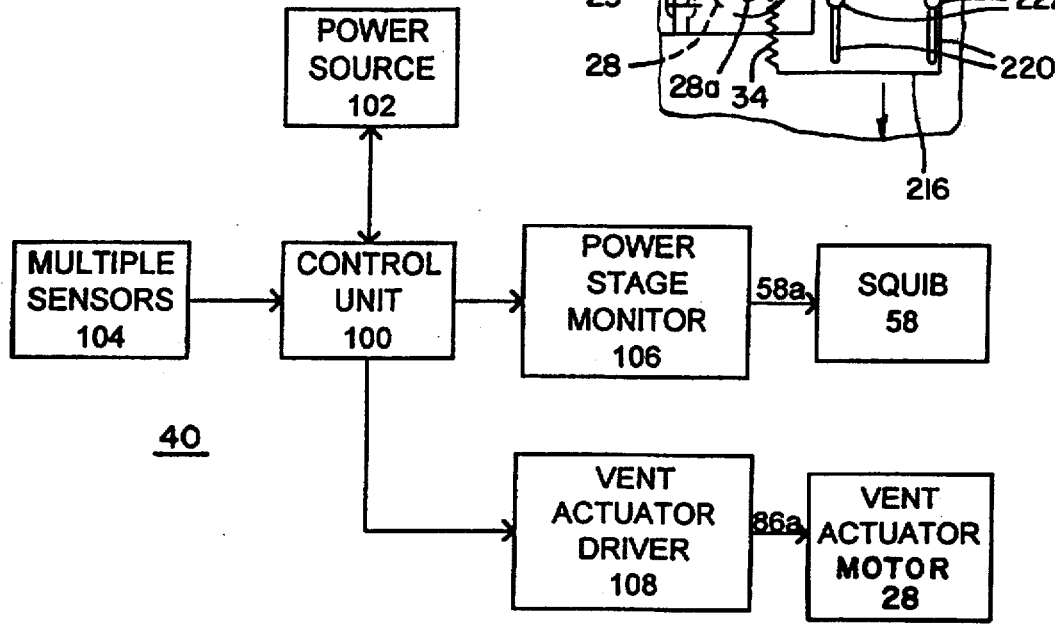

VARIABLE MASS FLOW AIRBAG MODULE

BACKGROUND OF THE INVENTION

1. Field of the Invention

The present invention relates to a new and improved variable mass flow airbag module which is controlled so that a desired mass flow of gas is directed to inflate the airbag in response to sensed occupant conditions and crash severity in order to provide a desired level of energy absorption capability for the inflated airbag for optimizing occupant protection. The module of the present invention is useful with pyrotechnic inflators, stored gas inflators, hybrid inflators and other inflator technologies.

2. Background of the Prior Art

U.S. Pat. No. 5,330,226, discloses a method and apparatus for detecting an out-of-position occupant for controlling the actuation of a vehicle occupant restraint system having a remote vent valve for venting gas generated by one or both inflators provided for inflating a single airbag restraint.

U.S. Pat. No. 5,232,243 discloses an occupant sensing apparatus for use in an occupant restraint system. The disclosed occupant sensing apparatus preferably monitors the passenger seat in the vehicle to detect the presence on an object in the seat, the position of the object and the weight of the object. A control algorithm is performed to control airbag inflation responsive to the detected values.

U.S. Pat. No. 5,074,583 discloses an airbag system for an automobile including a seating condition sensor that detects a seating condition of a passenger with respect to seat position, reclining angle, passenger size and posture. The airbag is operated in accordance with the seating condition of the passenger so that the inflated airbag is brought into optimal contact with the occupant.

U.S. Pat. No. 5,071,160 discloses a sensor for detecting the position of the passenger to effect deployment of the airbag to provide optimum protection for the passenger.

U.S. Pat. No. 4,984,651 discloses a passenger restraint system for motor vehicles including a switch member that detects the functional position of the safety belt. Activation of an airbag and a belt tensioner is dependent on the functional position of the safety belt.

U.S. Pat. No. 4,620,721 discloses an airbag system that also is responsive to the driver's use of a seat belt. The difference is that the threshold speed differs depending on the driver's use of the belt.

U.S. Pat. No. 4,243,248 discloses an airbag system including airbags for the driver and a front seat passenger. In the disclosed airbag system, the passenger side airbag can be inflated in two stages in response to an output signal generated from a sensor system when deceleration reaches first and second thresholds.

U.S. Pat. No. 3,966,224 discloses a multiple inflation rate airbag system using an air-augmented inflator which is activated in various manners in accordance with the occurrence of predetermined levels of intensity of impact to provide the multiple rates of inflation.

U.S. Pat. No. 3,767,002 discloses a seat occupancy responsive air cushion actuation and monitoring circuit that determines passenger occupancy before firing a squib which controls inflation of the airbag.

U.S. Pat. No. 3,767,228 discloses apparatus for controlling the operation of airbag inflation dependent on ambient temperature within the vehicle in which the apparatus is disposed.

U.S. Pat. No. 3,672,699 discloses an automatic restraint system arming control of an airbag dependent on the presence of an occupant to effect inflation of the airbag. If no occupant is present, the airbag is not inflated.

OBJECTS OF THE INVENTION

It is an object of the present invention to provide a new and improved airbag module that functions optimally over a larger range of crash situations and better than is currently possible with state of the art airbag modules.

It is another object of the present invention to provide a new and improved variable mass flow airbag module.

It is yet another object of the present invention to provide a new and improved airbag module having selectively controllable performance characteristics and providing a variable energy absorption capability.

Still another object of the present invention is to provide a new and improved airbag system capable of managing the mass flow of gas to inflate an airbag cushion to provide a needed amount of restraint capability for a particular crash situation.

Yet another object of the present invention is to provide new and improved, selectively controlled, variable mass flow driver side and passenger side airbag modules that utilize a variety of different types of airbag inflators including pyrotechnic, stored compressed gas, hybrid, and other inflator technologies.

BRIEF SUMMARY OF THE PRESENT INVENTION

The foregoing and other objects and advantages of the present invention are accomplished in a new and improved variable mass flow, airbag module which includes a housing having gas ports in communication with an airbag to be inflated for receiving a quantity of gas for rapidly inflating the airbag. The housing has one or more vent openings controlled by a valve that is operable to vent a selectively controlled, variable amount of gas to provide an optimum mass flow of gas available to inflate the airbag.

BRIEF DESCRIPTION OF THE DRAWINGS

For a better understanding of the present invention, reference should be had to the following detailed description taken in conjunction with the drawings, in which:

FIG. 3 is a fragmentary cross-sectional view of a new and improved ventable housing for a driver side airbag module constructed in accordance with the features of the present invention;

FIG. 4 is a fragmentary, elevational view of the ventable housing of FIG. 3 illustrating a variable vent valve thereon;

FIG. 5 is a block diagram representation of a new and improved airbag firing control system in accordance with the features of the present invention.

DETAILED DESCRIPTION OF A PREFERRED EMBODIMENT OF THE INVENTION

Figure 1:
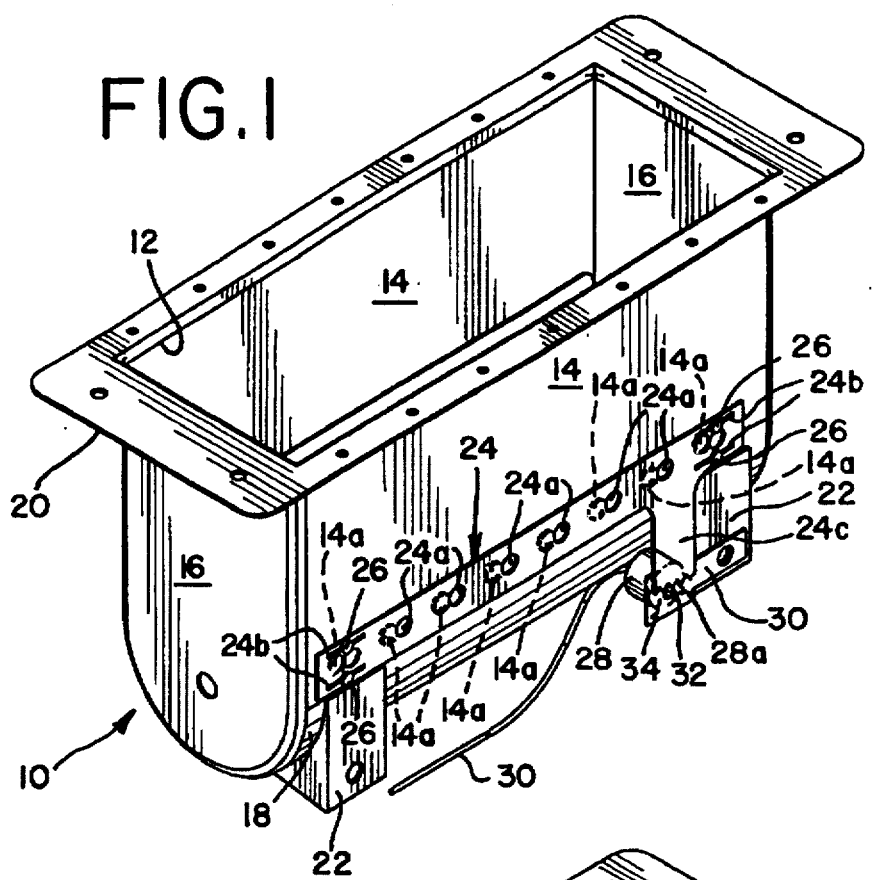
FIG. 1 is a perspective view of a new and improved ventable housing for a passenger side airbag module constructed in accordance with the features of the present invention and shown in a closed or non-venting condition.

Airbag modules for motor vehicles provide protection for drivers and passengers in the event of an accident. Driver side airbag modules are commonly mounted on the steering wheel of a motor vehicle and U.S. Pat. No. 5,456,493, incorporated herein by reference, illustrates a driver side airbag module both before and after inflation of the airbag thereof. Passenger side airbag modules are commonly mounted behind a dashboard panel of a motor vehicle and U.S. Pat. No. 5,460,403, incorporated herein by reference, and U.S. Pat. No. 5,472,228 illustrate passenger side airbag modules both before and after inflation of the airbag thereof.

Airbag modules both for the driver side and the passenger side of a vehicle generally include a sealed housing having a cover or doors on a side facing an occupant of the vehicle and operable to open upon airbag deployment during a vehicle crash. The sealed housing of an airbag module is fixedly secured beneath a dashboard panel or in a steering wheel of the motor vehicle, as the case may be, and provides a gas-tight enclosure for containing an airbag inflator and an airbag connected thereto and stored in a folded up condition until activated. A variety of different types of airbag inflators are available for providing a rapid flow of gas for inflating the airbag when the inflator is electrically activated. In general, airbag inflators may be classified as pyrotechnic types, stored gas types or hybrid types which employ both pyrotechnic materials as well as stored gas. Other types of inflator technologies are also becoming available.

The following U.S. patents, all incorporated hereby by reference, disclose several different types of airbag inflators used in driver side modules and in passenger side modules. U.S. Pat. No. 4,998,751 discloses a passenger side pyrotechnic type airbag inflator whereas U.S. Pat. No. 5,290,060 discloses a passenger side, hybrid type airbag inflator utilizing both pyrotechnic material and stored gas. U.S. Pat. No. 5,301,979 discloses a stored gas type airbag inflator useful in passenger side or driver side airbag inflator modules and similarly, U.S. Pat. No. 5,441,302 discloses a stored gas or flammable fluid mixture type airbag inflator useful in passenger side and/or drive side airbag modules. U.S. Pat. No. 5,360,232 discloses a hybrid type airbag inflator for a driver side or passenger side airbag module and U.S. Pat. No. 5,423,570 discloses a driver side airbag module employing a hybrid type inflator using pyrotechnic material and stored gas. U.S. Pat. No. 5,466,420 discloses a driver side airbag inflator of the pyrotechnic type.

All of the airbag inflators of any of the above types are designed to be electrically or otherwise activated and when so activated, a known or predetermined mass of gas is generated and/or released for inflating an associated airbag. Once electrical activation is commenced, the predetermined or known mass of gas is produced or released and once the generation or gas release process is started, the gas generation cannot readily be discontinued or stopped if only a lesser mass of gas is needed or desired. Thus, once electrical activation is initiated, the mass flow of gas is not controlled. In the present invention, means are provided for venting a portion of the mass flow of gas so that all of the gas does not vent into the airbag.

Figure 2:
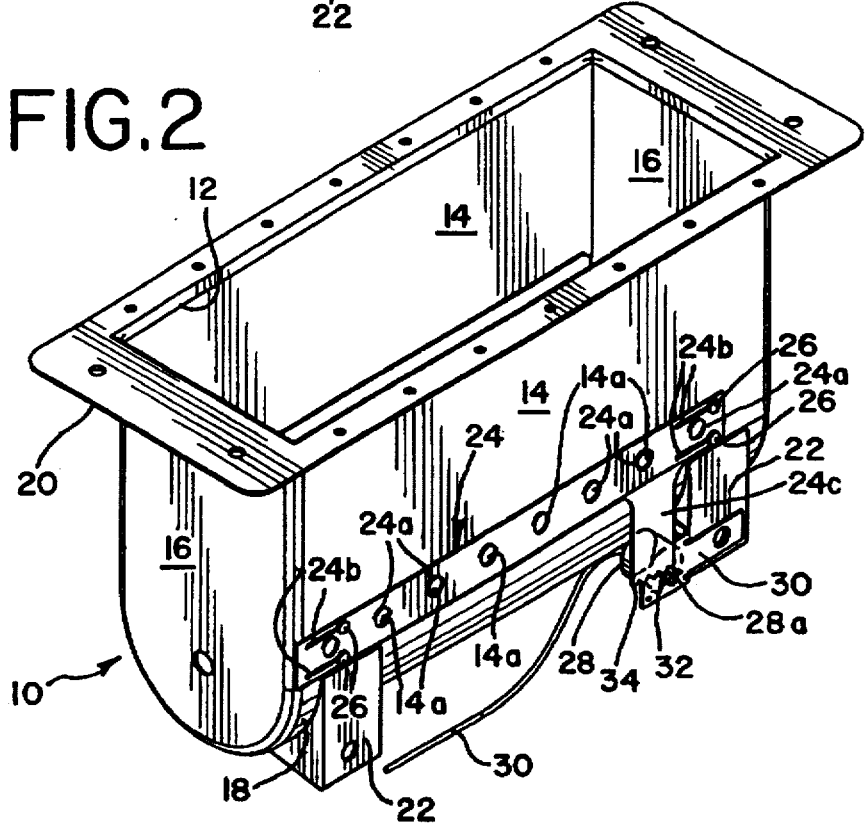
FIG. 2 is a similar view of the ventable housing of FIG. 1 shown in an open or venting condition.

Referring now to FIGS. 1 and 2, therein is illustrated a housing 10 of a passenger side airbag module for containing an inflator and associated airbag in a folded up condition ready for rapid deployment when the inflator is electrically activated in an emergency. The housing 10 is formed with a large rectangular opening 12 on one side which is normally closed and sealed against outside contaminants by a cover or door in a manner known in the art. The large rectangular opening 12 permits a rapidly inflating airbag to move out of the housing 10 when the inflator is actuated and pressure from the rapidly inflating airbag causes the door or cover to open.

The housing 10 includes a pair of opposite parallel side walls 14 joined to narrow opposite end walls 16 and a rounded bottom wall 18 having a radius larger than that of a generally cylindrical passenger side airbag inflator that is mounted in the housing beneath the folded up airbag in a manner known in the art. The housing 10 generally includes a rectangular mounting flange 20 extending around the enlarged opening 12 for facilitating mounting of the airbag module beneath a panel in a motor vehicle. In addition, a lower end portion of the housing 10 may be provided with mounting bracket structures 22 adjacent opposite ends for securing the housing to structural elements in the motor vehicle below the dash panel.

In accordance with the present invention, a lower portion of at least one of the side walls 14 of the housing 10 is formed with a row of vents or vent openings 14a generally parallel to the upper mounting flange 20. The vent openings 14a may be circular in shape and can be formed by punching or drilling at equally spaced intervals along the length of the side wall. The vent openings 14a are closed by an elongated valve member 24 which is supported for longitudinal sliding movement on the housing side wall 14 between the closed position of FIG. 1 and a fully open position of FIG. 2 for maximum venting action of the inflation gas present in the housing 10. The vent openings 14a can be normally closed or normally open, however a normally open position is preferred for failsafe operation with an out of position situation, such as for a rearwardly seat. The valve member 24 is formed with a plurality of vent openings 24a spaced apart along a center line at intervals matching the spacing or intervals between the vent openings 14a in the housing wall 14. Preferably, all of the vent openings 14a and 24a are of the same or a similar size. The valve member 24 is formed with two pairs of parallel slots 24b adjacent opposite ends and headed mounting pins 26 extending out from the adjacent side wall 14 of the housing 10 extend through the slots 24b to support the sliding valve 24 on the housing and limit the longitudinal travel thereof.

Movement of the valve 24 between the closed position of FIG. 1 wherein the valve vent openings 24a are offset from the side wall opening 14a and the fully open position of FIG. 2 wherein the valve vent openings are aligned directly opposite to counterpart side wall openings is controlled by an electric motor 28 mounted on a bracket or plate 30 secured to one of the mounting brackets 22 on the bottom wall 18 of the housing 10. The motor 28 is supplied with electrical power through an electrical cable 30 and includes an output shaft 28a supporting a pinion gear 32 engaging a rack of teeth 34 provided on a depending drive tab 24c of the slide valve 24. An electrical control signal supplied through the cable 30 when the airbag is to be inflated can be tailored to move the slide valve 24 to a fully closed position to eliminate venting action or to a partially open or intermediate position when venting action is required. If no signal is provided, the valve 24 will remain in the open position and a maximum venting of gas will be provided when the airbag inflator is electrically activated.

Also, the timing of the electrical power supplied to the motor 28 may be selectively adjusted relative to the time of electrical activation of the associated airbag inflator to achieve a delayed venting action as desired or the valve 24 may be fully or partially opened a selectively adjustable time interval before initiation of an inflation cycle occurs.

Referring now to FIG. 5, there is shown a block diagram representation of the airbag control system 40 in accordance with the present invention. The airbag control system 40 includes an electronic control unit 100 (ECU), a power source 102 and a plurality of sensors represented by multiple sensors block 104 which are coupled to the ECU 100. The ECU 100 is suitably programmed to perform the venting or mass flow of gas control functions of the invention as illustrated and described with respect to FIGS. 1 and 2. A power stage and monitor block 106 is coupled to the ECU 100 and is connected to an airbag inflator control device or activating squib 58 via a terminal 58a. The power stage and monitor block 106 is also capable of supplying electrical energy to the squib 58 of the associated airbag inflator in the airbag inflator module. A monitor included within the power stage 106 monitors failure modes of the power stage and subsequent gas release or gas generation initiated by the squib 58. A vent actuator driver block 108 is connected between the ECU 100 and the vent actuator motor 28 via a terminal 86a to operatively control the venting operation of the slide valve 24. The multiple sensors 104 advantageously include an acceleration sensor; a temperature sensor driver; a temperature sensor passenger; a buckle switch driver; a buckle switch passenger; an out-of-position sensor driver; an out-of-position sensor passenger and an optional seat occupancy sensor passenger.

U.S. patent application Ser. No. 08/149,296, filed Oct. 29, 1993, entitled AIRBAG SYSTEM FOR A MOTOR VEHICLE, now U.S. Pat. No. 5,411,289, issued May 2, 1995, discloses an airbag system for a motor vehicle including an electronic control unit, power source and the above-mentioned multiple sensors used in conjunction with multiple level multiple sensors used in conjunction with multiple level gas generation sources. The subject matter of the above-identified patent is incorporated herein by reference.

Figure 6:
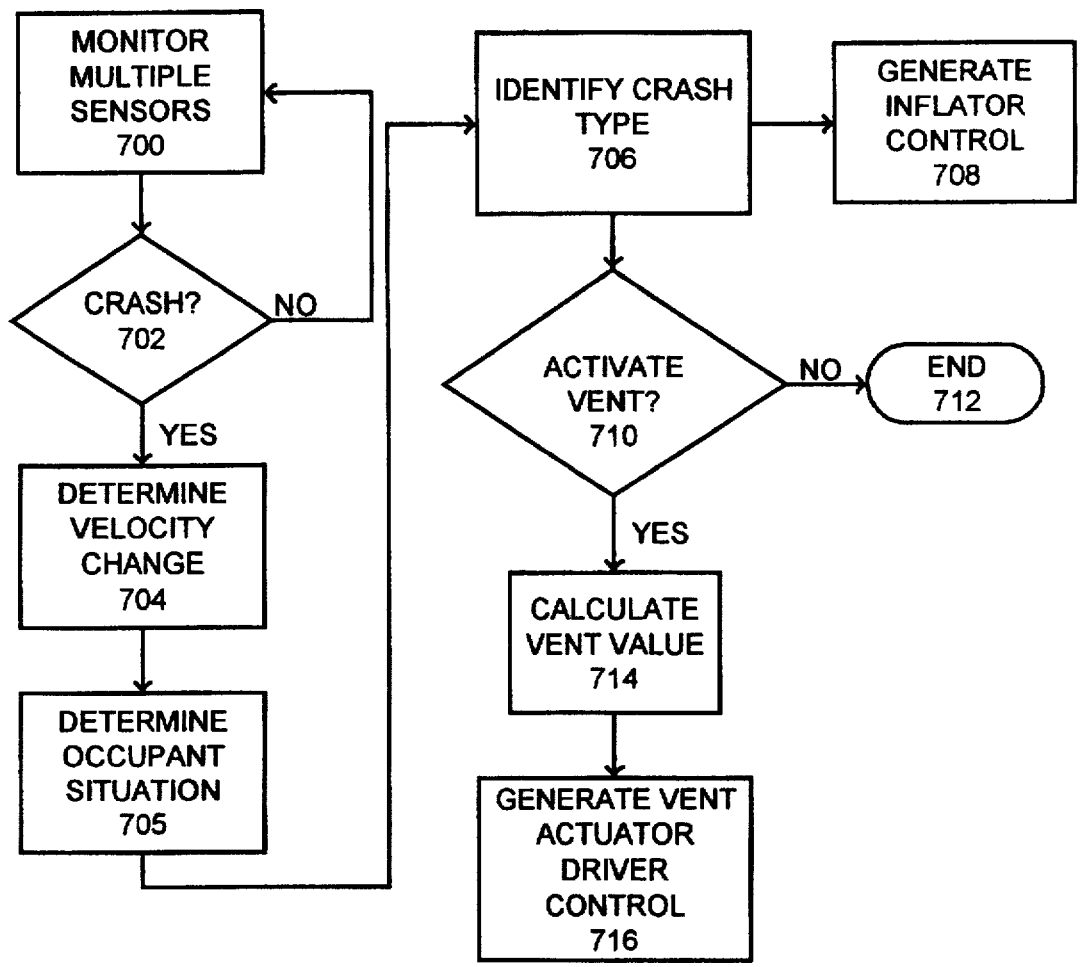
FIG. 6 is a flow chart illustrating sequential steps performed by an electronic control unit of the airbag firing control system of FIG. 1.

Referring now to FIG. 6, there is shown a flow chart illustrating sequential steps performed by the electronic control unit (ECU) 100. Sequential operations begin with the ECU 100 monitoring the multiple sensors 104 as indicated at a block 700. The ECU 100 utilizes the monitored sensor inputs to identify a crash or accident occurrence as indicated at a decision block 702. When a crash or accident is identified at decision block 702, the ECU 100 determines a velocity change at a block 704. A determination of occupant situation, such as belted, position, size, is made as indicated at a block 705 and can be utilized to select appropriate mass flow for bag inflation. Next the ECU 100 identifies the crash severity or type as indicated at a block 706, and then generates an inflator control signal used to activate the squib 58 of the associated airbag inflator as indicated at a block 708. The ECU 100 next determines whether vent slide valve 24 should be activated to eliminate or vary venting of the housing 10 as indicated at a decision block 710. If it is determined at the decision block 710 that the maximum mass flow is required, the slide valve 24 is activated and moved to the fully closed position (FIG. 1) and the sequential operations are completed as indicated at a block 712. Otherwise, when it is determined that opening the vent slide valve 24 is required to reduce the mass flow of gas to the airbag below a maximum level, the ECU 100 calculates a venting value as indicated at a block 714 and generates a vent actuator driver control signal for the motor 28 as indicated at a block 716. The venting value at block 714 is calculated to determine the size of the module housing vent opening for appropriate mass flow airbag inflation.

Referring now to FIGS. 3 and 4, therein is illustrated a driver side airbag module 200 mounted on a vehicle steering wheel 202 and including a housing 204 containing an airbag inflator 206 for inflating an airbag 208 shown in a folded up condition beneath a door or cover 210 which is opened by pressure from inflation of the airbag when the airbag inflator is electrically activated. When the airbag inflator 206 is electrically activated, a mass of gas flows out through ports 206a in the inflator canister into the housing 214 and the airbag 208 begins to inflate.

In accordance with the present invention, when less than a maximum mass flow of gas is desired for inflation of the airbag 208, a portion of the gas is vented to the atmosphere through a vent opening 212 provided in a base wall 214 of the housing 204. The vent opening 212 is normally open until airbag inflation is initiated. A slide valve 216 has a vent opening 218 offset from the opening 212 (FIG. 4) when the slide valve is in a closed position. The slide valve 216 is formed with a pair of elongated slots 220 in parallel on opposite sides of the vent opening 218. The slide valve 216 is supported for movement from an open position to a partially open or fully closed position (Arrow A—FIG. 4) for selectively venting a portion of the mass flow of gas by a plurality of headed pins 222 extending outwardly from the base 214 of the housing 204. Movement of the slide valve 216 is initiated by electric power supplied to an electric drive motor 28 mounted on motor support bracket 29 attached to bracket 31 used for securing the airbag inflator module 200 to the steering wheel. The motor 28 has an output shaft 28a driving a pinion gear 32 engaged with a rack of teeth 34 along an edge of the slide valve 216.

As in the embodiment of FIGS. 1 and 2, when the motor 28 is energized, the pinion gear 32 rotates to move the slide valve 216 out of the opened position wherein the vent openings 212 and 218 are directly opposite one another to a partially open venting position or a fully closed position (FIG. 4).

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A variable mass flow, airbag module system for use in a vehicle comprising:

an airbag module, said airbag module including a housing in communication with an inflatable airbag;

gas supply means for said housing for rapidly providing inflation gas for inflating said airbag;

vent means in a wall of said housing; and valve means movable between a first position closing off said vent means and a second position for opening said vent means for venting a portion of said gas supplied in said housing;

valve actuator means for operatively controlling said valve means; and electronic control means for controlling both said gas supply means and said valve actuator means, said electronic control means being responsive to multiple sensed inputs for selectively activating said valve actuator means and thus selectively varying the mass flow of said inflation gas directed to inflate said airbag.

2. A variable mass flow, airbag module system as recited in claim 1, wherein;

said valve actuator means includes an electric motor.

3. A variable mass flow, airbag module system as recited in claim 2, wherein;

said valve actuator means includes a gear driven by said motor in driving engagement with said valve means.

4. A variable mass flow, airbag module system as recited in claim 1, wherein;

said electronic control means is coupled to multiple sensors that provide said multiple sensed inputs, and said multiple sensors monitoring predetermined conditions of the vehicle.

5. A variable mass flow, airbag module system as recited in claim 4, wherein:

said multiple sensors monitor predetermined conditions of the occupant.

6. A variable mass flow, airbag module system as recited in claim 1, wherein:

said valve means includes a gate slidably mounted on said housing wall from said first position covering said vent opening toward said second position uncovering said vent opening.

* * * * *